United States Patent
Hsieh et al.

(10) Patent No.: US 9,229,276 B2
(45) Date of Patent: Jan. 5, 2016

(54) METHOD FOR MANUFACTURING A LIQUID CRYSTAL DISPLAY PANEL

(75) Inventors: Chung-Ching Hsieh, Hsin-Chu (TW);
Chia-Hsuan Pai, Hsin-Chu (TW);
Cheng-Wei Huang, Hsin-Chu (TW);
Te-Sheng Chen, Hsin-Chu (TW); Norio Sugiura, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 1161 days.

(21) Appl. No.: 12/534,833

(22) Filed: Aug. 3, 2009

(65) Prior Publication Data

US 2010/0053527 A1 Mar. 4, 2010

(30) Foreign Application Priority Data

Sep. 3, 2008 (TW) .............................. 97133812 A

(51) Int. Cl.
*C08F 2/48* (2006.01)
*G02F 1/1337* (2006.01)
(Continued)

(52) U.S. Cl.
CPC .......... *G02F 1/133711* (2013.01); *C09K 19/12* (2013.01); *C09K 19/32* (2013.01); *C09K 19/322* (2013.01); *C09K 2019/0448* (2013.01); *C09K 2019/122* (2013.01); *G02F 1/133788* (2013.01); *G02F 2001/13775* (2013.01);
(Continued)

(58) Field of Classification Search
CPC .................... G02F 1/133711; G02F 1/133788; G02F 2001/133397; G02F 2001/13775; G02F 2202/022; G02F 2202/023; C09K 19/12; C09K 19/32; C09K 19/322; C09K 2019/0448; C09K 2019/122

USPC .......................................................... 427/508
See application file for complete search history.

(56) References Cited

U.S. PATENT DOCUMENTS

2005/0116200 A1 6/2005 Nakanishi et al.
2005/0136196 A1 6/2005 Kataoka
(Continued)

FOREIGN PATENT DOCUMENTS

| CN | 101013262 A | 8/2007 |
| CN | 101045866 | * 10/2007 ............. C09K 19/20 |

OTHER PUBLICATIONS

Machine Translation of CN101045866.*
(Continued)

*Primary Examiner* — Robert S Walters, Jr.
(74) *Attorney, Agent, or Firm* — Rabin & Berdo, P.C.

(57) ABSTRACT

A method for manufacturing LCD panels includes providing upper and lower substrates; interposing a liquid crystal material composed of at least one liquid crystal molecule and at least two photosensitive monomers between the upper and lower substrates, at least one first photosensitive monomer having an absorption peak larger than 300 nm and at least one second photosensitive monomer having an absorption peak smaller than 300 nm; applying a voltage between the upper and lower substrates and irradiating with ultra-violet radiation having a first wavelength larger than 300 nm for a first time interval for polymerizing most first photosensitive monomers to provide an alignment polymer; and separately irradiating with ultra-violet radiation having a second wavelength for a second time interval, the second wavelength being larger than the first wavelength. The Irradiating steps are separate and, when irradiating with the first wavelength precedes irradiating with the second wavelength, residual monomers are reduced.

15 Claims, 3 Drawing Sheets

(51) Int. Cl.
*C09K 19/12* (2006.01)
*C09K 19/32* (2006.01)
*C09K 19/04* (2006.01)
*G02F 1/1333* (2006.01)
*G02F 1/137* (2006.01)

(52) U.S. Cl.
CPC ............... *G02F2001/133397* (2013.01); *G02F 2001/133715* (2013.01); *G02F 2202/022* (2013.01); *G02F 2202/023* (2013.01)

(56) References Cited

U.S. PATENT DOCUMENTS

2006/0038936 A1* 2/2006 Hirosawa .................. 349/93
2008/0236727 A1* 10/2008 Hsieh et al. ................ 156/145

OTHER PUBLICATIONS

Machine translation of CN 101045866 including English abstract and untranslated Chinese publication.*

* cited by examiner

METHOD FOR MANUFACTURING A LIQUID CRYSTAL DISPLAY PANEL

This application claims the benefit of Taiwan application Serial No. 97133812, filed Sep. 3, 2008, the subject matter of which is incorporated herein by reference.

BACKGROUND OF THE INVENTION

1. Field of the Invention

The invention relates in general to a liquid crystal display (LCD) panel and a method for manufacturing the same, and more particularly to an LCD panel using polymer-stabilizing alignment technology and a method for manufacturing the same.

2. Description of the Related Art

In recent years, alignment technology such as polymer-stabilizing alignment (PSA) technology is used in manufacturing LCD panel. According to the PSA technology, photosensitive monomers are mixed in a liquid crystal layer, and after the photosensitive monomers are arranged, an energy source such as ultra-violet or heat is applied to allow photosensitive monomers to be polymerized as a polymer to guide the arrangement of liquid crystal molecules.

However, the LCD panel using PSA technology is susceptible to the problems such as Mura or image sticking. Mura refers to the problem which occurs when local image has low contrast or non-uniformed luminance. Image sticking refers to the problem which occurs if previous image stays for a long duration of time and is overlapped with the subsequent image when an image displayed on the LCD panel displays over a long duration is switched to another image.

The current solution is to dope a light initiator in the liquid crystal layer to initiate polymerization reaction and make polymerization reaction more complete. However, despite the light initiator is added during the manufacturing process, the manufactured LCD panel still has image sticking problem.

SUMMARY OF THE INVENTION

The invention is directed to a liquid crystal display (LCD) panel and a method for manufacturing the same. According to the invention, two processes of polymerization reaction are applied, the ultra-violet used in the second polymerization reaction has a larger wavelength, and at least one photosensitive monomer whose absorption peak is larger than 300 nm is added to the liquid crystal material which is used for absorbing the ultra-violet in the second polymerization reaction. Thus, the residual photosensitive monomers in the liquid crystal material are reduced, and the problem of image sticking can be improved.

According to a first aspect of the present invention, an LCD panel is provided. The LCD panel comprises a lower substrate, an upper substrate and a liquid crystal layer interposed between the lower and the upper substrates. The liquid crystal layer comprises a plurality of liquid crystal molecules and a plurality of alignment polymers, wherein an alignment polymer is formed by way of polymerizing at least two photosensitive monomers, and the absorption peak of at least one photosensitive monomer is larger than 300 nm.

According to a second aspect of the present invention, a method for manufacturing an LCD panel. The method comprises the following steps. Firstly, an upper substrate and a lower substrate are provided. Next, a liquid crystal material is interposed between the upper and lower substrates, wherein the liquid crystal material comprises at least one liquid crystal molecule and at least two photosensitive monomers, and the absorption peak of at least one photosensitive monomer is larger than 300 nm. Then, a voltage is applied between the upper substrate and the lower substrate, and a ultra-violet with a first wavelength is used for irradiation so as to allow most photosensitive monomers to be polymerized as a polymer. Lastly, a ultra-violet with a second wavelength is used for irradiation, wherein the second wavelength is larger than the first wavelength so as to allow residual photosensitive monomers to be polymerized.

According to a third aspect of the present invention, a method for manufacturing an LCD panel is provided. The method comprises the following steps. Firstly, an upper substrate and a lower substrate are provided. Next, a liquid crystal material is interposed between the upper and lower substrates, wherein the liquid crystal material comprises at least one liquid crystal molecule and at least two photosensitive monomers, and the absorption peak of at least one first photosensitive monomer is larger than 300 nm, the absorption peak of at least one second photosensitive monomer is smaller than 300 nm. Then, a voltage is applied between the upper substrate and the lower substrate, and a ultra-violet with a first wavelength is used for irradiation so as to allow most photosensitive monomers to be polymerized as a polymer. Lastly, a ultra-violet with a second wavelength is used for irradiation, wherein the second wavelength is larger than the first wavelength so as to allow residual photosensitive monomers to be polymerized.

The invention will become apparent from the following detailed description of the preferred but non-limiting embodiments. The following description is made with reference to the accompanying drawings.

DETAILED DESCRIPTION OF THE INVENTION

As indicated in the experimental results provided by the inventor, the more residual photosensitive monomers an LCD panel has, the worse the problems of luminance uniformity and image sticking will be. The inventor concludes that luminance non-uniformity and image sticking occur when the photosensitive monomers of an LCD panel are not completely polymerized as a polymer, and impurity substances such as photosensitive monomers are filled in the liquid crystal material and cause negative impact on the reaction of liquid crystal molecules. Thus, the invention provides a method of manufacturing an LCD panel. According to the manufacturing method of the invention, two processes of polymerization reaction are applied, such that the photosensitive monomers are completely polymerized as a polymer and will not be left in the liquid crystal material. Thus, luminance non-uniformity and image sticking can be improved. Particularly, in the second polymerization reaction the ultra-violet has a larger wavelength, and simultaneously at least one photosensitive monomer whose absorption peak is larger than 300 nm is mixed in the liquid crystal material to absorb ultra-violet in the second polymerization reaction, as a result of increased efficiency of polymerization reaction of residual photosensitive monomers.

The method of manufacturing LCD panel comprises the following steps. Firstly, an upper substrate and a lower substrate are provided. Next, a liquid crystal material is interposed or disposed between the upper and lower substrates, wherein the liquid crystal material comprises at least one liquid crystal molecule and at least two photosensitive monomers, the absorption peak of at least one photosensitive monomer is larger than 300 nm, and the absorption peak of the other photosensitive monomer can be smaller than 300 nm. Then, a ultra-violet with a first wavelength is used for irradiation, so as to allow most photosensitive monomers to be polymerized as a polymer. Lastly, a ultra-violet with a second wavelength is used for irradiation, wherein the second wavelength is larger than the first wavelength, and the photosensitive monomer whose absorption peak is larger than 300 nm absorbs the ultra-violet with the second wavelength so as to allow residual photosensitive monomers to be polymerized. The structure and the method of manufacturing an LCD panel are disclosed below with accompanying drawing. However, these drawings and elaboration are only an embodiment under the spirit of the invention and are not for limiting the scope of protection of the invention.

Figure 1A:
FIGS. 1A~1E show the processes of a method of manufacturing an LCD panel according to a preferred embodiment of the invention.
Figure 1A:

Referring to FIGS. 1A~1E, the processes of a method for manufacturing an LCD panel according to a preferred embodiment of the invention are shown. The method of manufacturing the LCD panel of the present embodiment of the invention comprises the following steps. Firstly, an upper substrate 110 and a lower substrate 120 are provided as indicated in FIG. 1A.

Figure 1B:
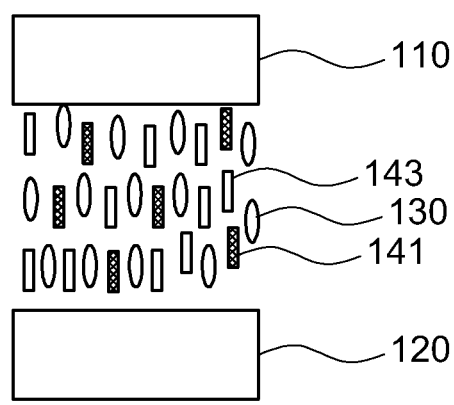

Next, a liquid crystal material is interposed between the upper substrate 110 and the lower substrate 120. The liquid crystal material comprises a plurality of liquid crystal molecule 130 and at least two photosensitive monomers, and the absorption peak of at least one photosensitive monomer is larger than 300 nm. In the present embodiment of the invention, the liquid crystal material comprises two photosensitive monomers, namely, a first photosensitive monomers 141 and a second photosensitive monomers 143 as indicated in FIG. 1B. The absorption peak of the first photosensitive monomers 143 is larger than 300 nm, so the first photosensitive monomers 143 can be at least one of a compound I or a compound II. The absorption peak of the second photosensitive monomers 143 preferably is smaller than 300 nm, but the absorption peak of the second photosensitive monomers 143 can also be without any restriction. The second photosensitive monomers 143 can be as a compound III.

The compound I is expressed as below:

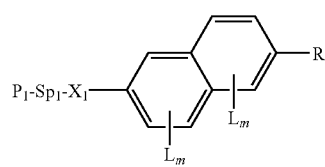

[I]

The compound II is expressed as below:

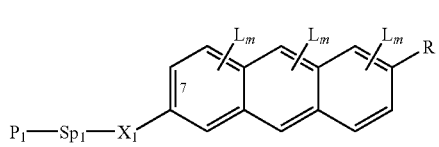

[II]

The compound III is expressed as below:

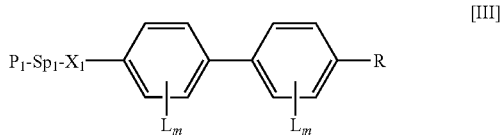

[III]

"L" denotes hydrogen atom, fluorine atom, chlorine atom, cyano-group, alkyl group, alkyl-carbonyl group, alkoxycarbonyl group or alkylcarbonyloxy group with 1~7 carbon atoms, wherein m≥1. When "L" denotes alkylcarbonyloxy group with 1~7 carbon atoms, one or more than one hydrogen atom can be replaced by fluorine atom or chlorine atom.

"R" denotes hydrogen atom, fluorine atom, chlorine atom, cyano-group (—CN), thiocyanato group (—SCN), sulphur pentafluoride group (—SF$_5$H), nitrite (—NO$_2$), a straight-chain or a branched-chain alkyl group with 1~12 carbon atoms or X$_2$-Sp$_2$-P$_2$ group. When "R" denotes a straight-chain or a branched-chain alkyl group with 1~12 carbon atoms, in which one or two nonadjacent of —CH$_2$— group is replaced by oxygen atom, sulfur atom, vinylene (—CH=CH—), carbonyl group (C=O), carboxy group (—COO—), carbothio group (S—CO—, —CO—S—) or alkyne.

"X$_1$" and "X$_2$" respectively denote oxygen atom, sulfur atom, methoxy (—OCH$_2$—), carbonyl group (C=O), carboxy group (—COO—), carbamoyl (—CO—N$^O$R—, —N$^O$R—CO—), methylthio group (—CH$_2$S—, —SCH$_2$—), ethenylcarbonyl (—CH=CH—COO—), carbonylethenyl (—COO—CH=CH—) or a single bond.

"Sp$_1$" and "Sp$_2$" denote a straight-chain or a branched-chain alkyl group with 1~8 carbon atoms or a single bond.

"P$_1$" and "P$_2$" respectively denote a polymerizable group. In a preferred embodiment, the polymerizable group can be functional group 1 (expressed as chemical formula [1]), wherein "Y" is selected from hydrogen atom, methyl alkyl group, fluorine atom, trifluoromethyl (—CF$_3$) and phenyl.

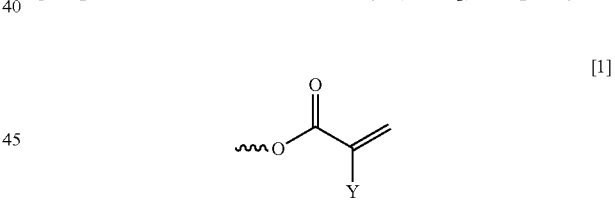

[1]

In a preferred embodiment, the first photosensitive monomers 141 can be a compound I-1 whose chemical formula is expressed below, and still belongs to the compound I, in which "L$_m$" denotes hydrogen atom, m=3, "R" denotes "X$_2$-Sp$_2$-P$_2$" group, "X$_1$" and "X$_2$" denote a single bond, "Sp$_1$" and "Sp$_2$" denote a single bond, "P$_1$" and "P$_2$" denote functional group 1, and "Y" denotes methyl alkyl group.

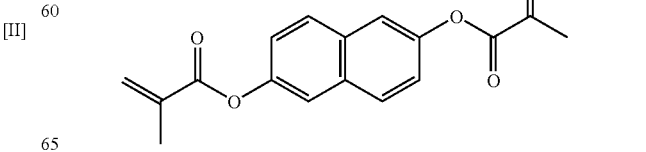

[I-1]

In a preferred embodiment, the first photosensitive monomers 141 can be a compound II-1 whose chemical formula is expressed below, and belongs to the compound II, in which "$L_m$" denotes hydrogen atom, m=2 or 3, "R" denotes "$X_2$-$Sp_2$-$P_2$" group, "$X_1$" and "$X_2$" denote a single bond, "$Sp_1$" and "$Sp_2$" denote a single bond, "$P_1$" and "$P_2$" denote functional group 1, and "Y" denotes methyl alkyl group.

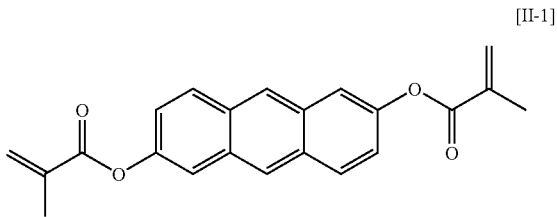 [SMILES: C=C(C)C(=O)Oc1ccc2cc3cc(OC(=O)C(=C)C)ccc3cc2c1]

[II-1]

In a preferred embodiment, the second photosensitive monomers 143 can be a compound III-1 (chemical formula is expressed below), and belongs to the compound III, in which "$L_m$" denotes hydrogen atom, m=4, "R" denotes "$X_2$-$Sp_2$-$P_2$" group, "$X_1$" and "$X_2$" denote a single bond, "$Sp_1$" and "$Sp_2$" denotes a single bond, "$P_1$" and "$P_2$" denotes functional group 1, and "Y" denotes methyl alkyl group.

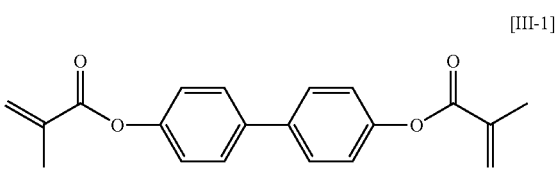 [SMILES: C=C(C)C(=O)Oc1ccc(-c2ccc(OC(=O)C(=C)C)cc2)cc1]

[III-1]

The mixture proportion of liquid crystal molecules and the photosensitive monomers in a liquid crystal material is as follows. At least two photosensitive monomers approximately amount to 0.1~10 weight percents of the liquid crystal material, and liquid crystal molecules approximately amount to 99.9~90 weight percents of the liquid crystal material. Particularly, the first photosensitive monomers 141 whose absorption peak is larger than 300 nm approximately amount to 50~70 weight percents of the photosensitive monomers. Besides, the liquid crystal material further comprises an initiator whose weight amounts to less than 0.002% of the liquid crystal material for initiating the first polymerization reaction.

Figure 1C:
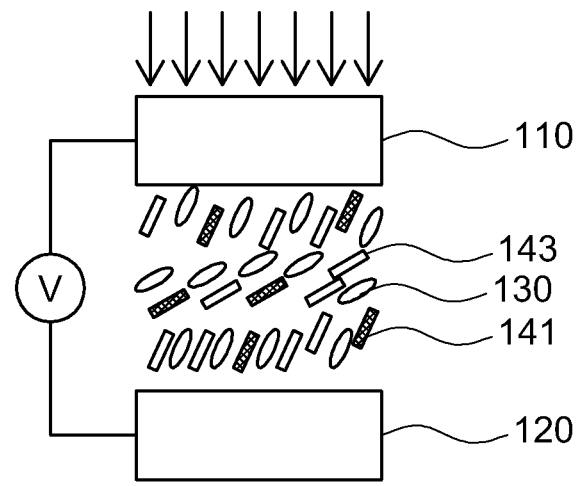

Next, as indicated in FIG. 1C, after a voltage is applied between the two substrates 110 and 120 and the photosensitive monomers have already been arranged accordingly, a ultra-violet with a first wavelength is used for irradiating the liquid crystal molecules. In a preferred embodiment, the wavelength of ultra-violet (that is, the first wavelength) used in the first irradiating process ranges between 300 nm~340 nm, and the irradiating time is less than 1 minute. In the first irradiating process, most photosensitive monomers 141 and 143 are polymerized as a polymer (referring to 145 of FIG. 1D) so as to determine the pre-determined tilting angle. This is called the first polymerization reaction.

Figure 1D:
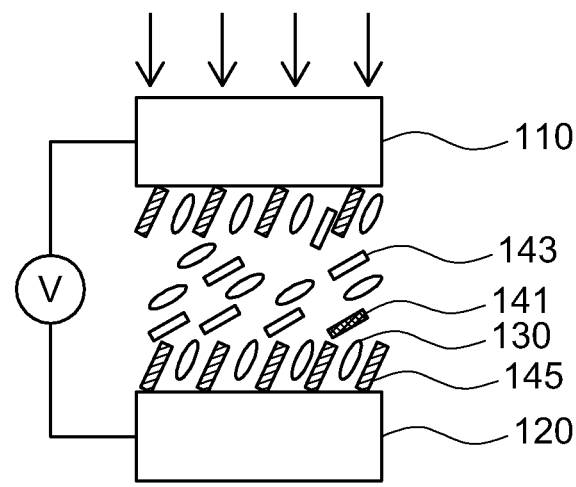

Then, as indicated in FIG. 1D, the same voltage is applied between the two substrates 110 and 120, and a ultra-violet with a second wavelength is used for irradiation. The second wavelength is larger than the first wavelength. In a preferred embodiment, the ultra-violet wavelength (the second wavelength) used in the second irradiating process ranges between 340 nm~380 nm. The ultra-violet used in the second irradiating process has larger wavelength and lower energy, such that other elements of the LCD panel will not be damaged after long duration of irradiation. Meanwhile, the first photosensitive monomers 141 whose absorption peak is larger than 300 nm can absorb the ultra-violet with a second wavelength (that is, 340 nm~380 nm), and residual photosensitive monomers 141 and 143 can be promptly polymerized as a polymer 145. This is called the second polymerization reaction. After the first polymerization reaction, the concentration of the reactant (that is, photosensitive monomers) plummets, and the catalyst (that is, light initiator) is consumed completely, therefore the occurrence of the second polymerization reaction becomes unlikely. However, the first photosensitive monomers 141 of the present embodiment of the invention can absorb the second wavelength ultra-violet, and is both a reactant and a catalyst in the second polymerization reaction, hence resolving difficulties in the initiation of the second polymerization reaction. In short, the second polymerization reaction adopts a gentle but effective way to initiate the polymerization reaction among the photosensitive monomers, and effectively reduce the residual photosensitive monomers in an LCD panel without damaging other elements of the LCD panel.

Figure 1E:
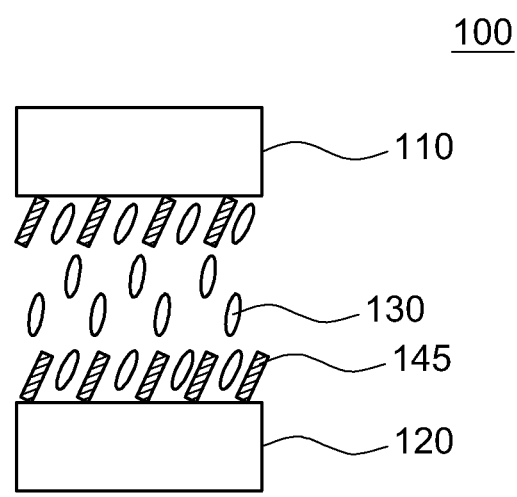

Lastly, the LCD panel 100 is completed as indicated in FIG. 1E. The LCD panel manufactured according to the above manufacturing method comprises an upper substrate 110, a lower substrate 120 and a liquid crystal layer interposed between the upper substrate 110 and the lower substrate 120. The liquid crystal layer comprises a liquid crystal molecule 130 and an alignment polymer 145. The alignment polymer 145 is formed by way of polymerizing at least two photosensitive monomers, and the absorption peak of at least one photosensitive monomer is larger than 300 nm. Despite no voltage is applied, the liquid crystal molecule 130 will still tilt in conformity to the arrangement of the alignment polymer 145. As indicated in the following experimental results, the residuals of photosensitive monomers in the LCD panel manufactured according to the above manufacturing method are largely reduced.

Test of Residuals of Photosensitive Monomers:

Of the testing groups, no photosensitive monomer is added to the liquid crystal material of the blank group, but the liquid crystal material of other groups is formed by 99.7% of liquid crystal molecules and 0.3% of the photosensitive monomers. All the three experimental groups comprise two photosensitive monomers, a compound I-1 and a compound III-1, and the compound I-1 can absorb the ultra-violet whose wavelength is larger than 300 nm. The two photosensitive monomers are added to the liquid crystal material according to the proportions of 0.2%: 0.1%, 0.15%: 0.15%, and 0.1%: 0.2% respectively. The contrast group only comprises a single photosensitive monomer, that is, the compound III-1. The same polymerizing conditions including the same voltage, the same ultra-violet wavelength and same irradiation time are applied to all testing groups. Lastly, the residuals of the compound I-1 and the compound III-1 in the liquid crystal material are measured and the results are summarized in Table 1.

TABLE 1

Comparison of Liquid Crystal Mixture vs. Residuals of Photosensitive Monomers

| | | Residual of Photosensitive Monomers (ppm) | | |
|---|---|---|---|---|
| | Liquid Crystal Material | Compound III-1 | Compound I-1 | Total Amount |
| Blank Group | 100% of liquid crystal | NA | NA | NA |
| Contrast Group | 97% of liquid crystal + 0.3% of III-1 | 277 | NA | 277 |
| Experimental Group 1 | 97% of liquid crystal + 0.2% of III-1 + 0.1% of I-1 | 56.2 | 11.1 | 67.3 |
| Experimental Group 2 | 97% of liquid crystal + 0.15% of III-1 + 0.15% of I-1 | 39.8 | 10.5 | 50.3 |
| Experimental Group 3 | 97% of liquid crystal + 0.1% of III-1 + 0.2% of I-1 | 30.8 | 11.6 | 42.4 |

When the liquid crystal material comprises only the compound III-1 but not the compound I-1 (that is, the contrast group), the residuals of photosensitive monomers being 277 ppm is the highest among all testing groups. Once the liquid crystal material is doped with the compound I-1, under the same irradiating process and irradiating time, the photosensitive monomers will be promptly polymerized as a polymer, such that the total amount of residual photosensitive monomers in the liquid crystal material can be reduced to 40% at least (the total amount of residuals in experimental group 1 is 67.3 ppm), or even reduced to 15% (the total amount of residuals in experimental group 3 is 42.4 ppm). The experimental results shows that by adding photosensitive monomers ( compound I-1) whose absorption peak is larger than 300 nm to the liquid crystal mixture, the efficiency in the polymerization of the photosensitive monomers is increased, and the amount of free photosensitive monomers is reduced.

Furthermore, given that the photosensitive monomers amount to 0.3% of the liquid crystal material, the higher the mixing proportion of the compound I-1, the lower the residual of the photosensitive monomers. When the mixing proportion of the compound III-1 vs. the compound I-1 is 0.15%: 0.15% or 0.1%: 0.2%, the total amount of the residual photosensitive monomers is approximately reduced to be below 50 ppm, and the image display quality (including luminance uniformity and the image sticking property) is similar to the blank group which does not comprise any photosensitive monomers, such that mura or image sticking is resolved. Thus, the photosensitive monomer whose absorption peak is larger than 300 nm preferably amounts to approximately 50~70 weight percents of the photosensitive monomers.

According to the LCD panel and the manufacturing method thereof disclosed in the above embodiments of the invention, two processes of polymerization reaction are adopted. The first polymerization reaction is used for forming a pre-determined tilting angle, and the second polymerization reaction is used for consuming the residuals of photosensitive monomers. The ultra-violet used in the second irradiating process has larger wavelength and lower energy, such that other elements of the LCD panel will not be damaged after long duration of irradiation. Also, at least one of the photosensitive monomers whose absorption peak is larger than 300 nm is doped in the liquid crystal material for absorbing ultra-violet during the second polymerization reaction, such that the residual photosensitive monomers can be polymerized as a polymer within a shorter period of time. In short, the second polymerization reaction adopts a gentle but effective way to initiate the polymerization reaction among the photosensitive monomers, and effectively reduce the residual of the photosensitive monomers in an LCD panel without damaging other elements of the LCD panel, hence resolving the difficulties in the initiation of the second polymerization reaction.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing an LCD panel, comprising:
providing an upper substrate and a lower substrate;
interposing, between the upper substrate and the lower substrate, a liquid crystal material comprised of at least one liquid crystal molecule and at least two photosensitive monomers, at least one first photosensitive monomer having an absorption peak that is larger than 300 nm and at least one second photosensitive monomer having an absorption peak that is smaller than 300 nm;
applying a voltage between the upper substrate and the lower substrate and irradiating with ultra-violet radiation having a first wavelength that is larger than 300 nm for a first time interval for polymerizing first photosensitive monomers to provide an alignment polymer; and
irradiating with ultra-violet radiation having a second wavelength that is larger than the first wavelength for a second time interval so as to polymerize the first and second photosensitive monomers remaining after irradiating with the first wavelength,
wherein irradiating with ultra-violet radiation having the first wavelength for the first time interval is separate from irradiating with ultra-violet radiation having the second wavelength for the second time interval.

2. The method according to claim 1, wherein the photosensitive monomer having an absorption peak larger than 300 nm is at least one of compound I or compound II which follow:

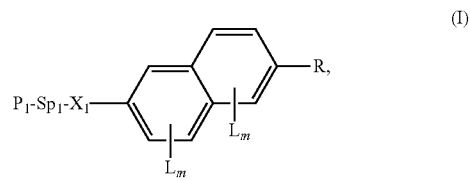

(I)

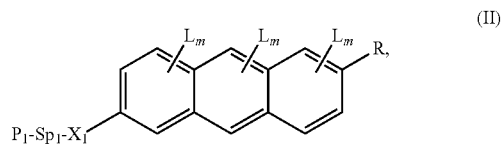

(II)

where
each "L" is independently selected from the group consisting of a hydrogen atom, a fluorine atom, a chlorine atom, a cyano-group, an alkyl group, an alkyl-carbonyl group, an alkoxycarbonyl group or an alkylcarbonyloxy group with 1-7 carbon atoms, wherein m≥1;

"R" denotes a hydrogen atom, a fluorine atom, a chlorine atom, a cyano-group, a thiocyanato group, a sulphur pentafluoride group, a nitrite, a straight-chain or a branched-chain alkyl group with 1-12 carbon atoms, optionally substituted with an oxygen atom, a sulfur atom, a vinylene group, a carbonyl group, a carboxy group, a carbothiogroup or an alkyne group, or $X_2$-$Sp_2$-$P_2$ group;

"$X_1$" and "$X_2$" respectively denote an oxygen atom, a sulfur atom, a methoxy group, a carbonyl group, a carboxy group, a carbamoyl group, a methylthio group, an ethenylcarbonyl, a carbonylethenyl group or a single bond;

"$Sp_1$" and "$Sp_2$" denote a straight-chain or a branched-chain alkyl group with 1-8 carbon atoms or a single bond; and "$P_1$" and "$P_2$" respectively are a polymerizable group.

3. The method according to claim 2, wherein when one "L" group is alkylcarbonyloxy group with 1-7 carbon atoms, one or more than one "L" groups are a fluorine atom or chlorine atom.

4. The method according to claim 2, wherein when "R" denotes a straight-chain or a branched-chain alkyl group with 1-12 carbon atoms, one or two nonadjacent —$CH_2$— groups thereof is replaced by an oxygen atom, a sulfur atom, a vinylene group, a carbonyl group, a carboxy group, a carbothio group or an alkyne group.

5. The method according to claim 1, wherein the photosensitive monomer having an absorption peak larger than 300 nm is

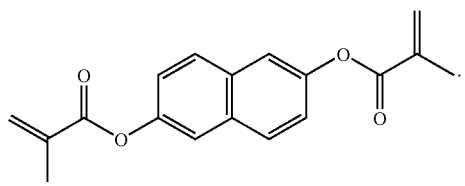 [SMILES: C=C(C)C(=O)Oc1ccc2cc(OC(=O)C(=C)C)ccc2c1]

6. The method according to claim 1, wherein the photosensitive monomer having an absorption peak larger than 300 nm is

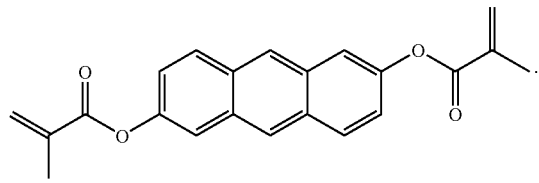 [SMILES: C=C(C)C(=O)Oc1ccc2cc3cc(OC(=O)C(=C)C)ccc3cc2c1]

7. The method according to claim 1, wherein the photosensitive monomer having an absorption peak smaller than 300 nm is compound III below:

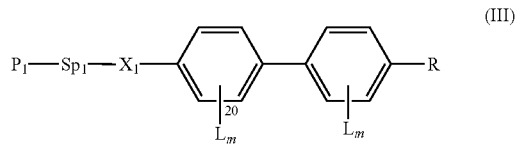

(III)

where each "L" is independently selected from the group consisting of a hydrogen atom, a fluorine atom, a chlorine atom, a cyano-group, an alkyl group, an alkyl-carbonyl group, an alkoxycarbonyl group or an alkylcarbonyloxy group with 1-7 carbon atoms, wherein m=4;

"R" denotes a hydrogen atom, a fluorine atom, a chlorine atom, a cyano-group, a thiocyanato group, a sulphur pentafluoride group, a nitrite, a straight-chain or a branched-chain alkyl group with 1-12 carbon atoms optionally substituted with an oxygen atom, a sulfur atom, a vinylene group, a carbonyl group, a carboxy group, a carbothiogroup or an alkyne group or an $X_2$-$Sp_2$-$P_2$ group;

"$X_1$" and "$X_2$" respectively are an oxygen atom or a sulfur atom, a methoxy group, a carbonyl group, a carboxy group, a carbamoyl group, a methylthio group, an ethenylcarbonyl group, a carbonylethenyl group or a single bond;

"$Sp_1$" and "$Sp_2$" denote a straight-chain or a branched-chain alkyl group with 1-8 carbon atoms or a single bond; and "$P_1$" and "$P_2$" respectively denote a polymerizable group.

8. The method according to claim 7, wherein, when one "L" group is an alkylcarbonyloxy group with 1-7 carbon atoms, one or more than one "L" groups are a fluorine atom or a chlorine atom.

9. The method according to claim 7, wherein, when "R" denotes a straight-chain or a branched-chain alkyl group with 1-12 carbon atoms, one or two nonadjacent —$CH_2$— group thereof is replaced by an oxygen atom, a sulfur atom, a vinylene group, a carbonyl group, a carboxy group, a carbothio group or an alkyne group.

10. The method according to claim 1, wherein the at least one second photosensitive monomer having an absorption peak that is smaller than 300 nm is expressed as

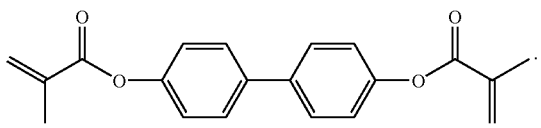 [SMILES: C=C(C)C(=O)Oc1ccc(-c2ccc(OC(=O)C(=C)C)cc2)cc1]

11. The method according to claim 1, wherein the at least two photosensitive monomers approximately amount to 0.1-10 weight percent of the liquid crystal material.

12. The method according to claim 1, wherein the photosensitive monomer having an absorption peak of larger than 300 nm approximately amounts to 50%-70% of the photosensitive monomers.

13. The method according to claim 1 further comprising an initiator amounting to less than 0.002 weight percent of the liquid crystal material.

14. The method according to claim 1, wherein the first wavelength ranges between 300 nm-340 nm.

15. The method according to claim 1, wherein the second wavelength ranges between 340 nm-380 nm.

* * * * *